Dec. 28, 1943.   W. D. LOUGHLIN   2,337,759
DELTA Q-METER
Filed Aug. 15, 1941

REACTANCE FACTOR

Q FACTOR

FREQUENCY M.C.

INVENTOR
William D. Loughlin
BY
Alfred W. Barber
ATTORNEY

Patented Dec. 28, 1943

2,337,759

UNITED STATES PATENT OFFICE 2,337,759

DELTA Q-METER

William D. Loughlin, Mountain Lakes, N. J., assignor to Boonton Radio Corporation, Parsippany-Troy Hills Township, Morris County, N. J.

Application August 15, 1941, Serial No. 406,981

5 Claims. (Cl. 175—183)

The present invention concerns electrical apparatus and in particular a device for measuring the Q or loss-factor of a condenser, inductance or oscillatory circuit.

One object of the present invention is to provide an improved Q-meter.

Another object is to provide a Q-meter operating in a simplified manner.

Still another object is to provide a Q-meter which measures Q values directly of either a capacity or an inductance.

A further object is to provide a Q-meter which measures the Q of condensers, inductances and circuits of combined capacity and inductance directly and which is particularly adapted to make such measurements at high frequencies, for instance, at frequencies above 30 megacycles.

These and other objects will be apparent from the detailed description of the invention given in connection with the various figures of the drawing.

Figure 1:
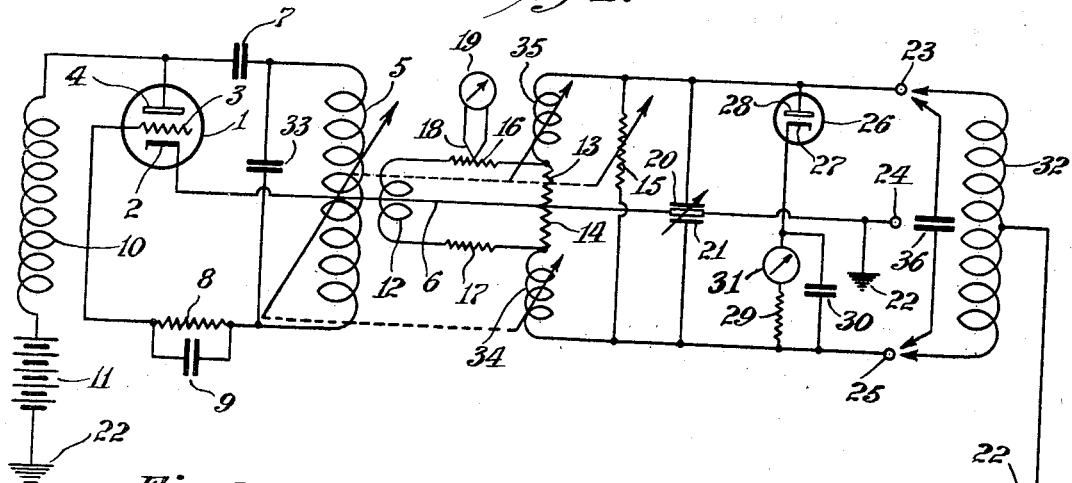
Figure 1 shows a circuit of one form of the present invention.

In the past a common method of measuring the $$Q = \frac{L\omega}{R}$$

of a coil has been to measure the voltage step-up in a tuned circuit formed with the coil. A small known voltage from a convenient source, such as a thermionic vacuum tube oscillator, is placed in series with the coil to be measured. The coil is resonated by means of a variable condenser and the resulting voltage across the coil is measured. For appreciable values of Q the Q is the ratio of the voltage across the coil to the voltage in series with the coil. A Q-meter according to the above description is shown and described in detail in Patent Number 2,137,787, entitled "Method and apparatus for electrical measurements" and which was issued to Harold A. Snow on November 22, 1938. In this Q-meter the voltage placed in series with the coil is kept constant and the voltmeter connected across the coil is calibrated directly in terms of Q. The Q of a condenser may be measured by placing it in parallel with the resonated coil and returning the variable condenser to produce resonance. The Q of the parallel condenser is given by the formula:

$$Q_x = \frac{C_2 - C_1}{C_1} \times \frac{Q_1 \times Q_2}{Q_1 - Q_2}$$

where $C_1$ is the initial capacity of the variable condenser, $Q_1$ is the initial reading of the Q-meter, $C_2$ is the capacity of the variable condenser after connecting the condenser being measured, and $Q_2$ is the Q-meter reading with the condenser to be measured connected in the circuit. Thus the Q-meter which has been described measures the Q of a coil directly but the Q of a condenser indirectly.

The present invention concerns a device for measuring directly the Q of a circuit having either a positive or negative apparent reactance or no apparent reactance. This is particularly useful in measuring parallel tuned circuits at very high frequencies. A variable frequency oscillator supplies a known voltage in series with an internal inductance in the Q measuring circuit. The inductance of the Q measuring circuit is initially tuned by a constant capacity. The voltage across the Q measuring circuit in the absence of an external circuit is set to infinity on the Q scale of the Q circuit voltmeter. In order to change the frequency at which a measurement is to be made the inductance of the oscillator circuit and the inductance of the Q measuring circuit are changed by equal amounts, thereby keeping the Q circuit tuned to resonance with the same capacity. This initial Q circuit capacity is marked zero on its control dial. If the Q of a condenser is to be measured it is connected in parallel with the Q measuring circuit and the Q circuit variable condenser is decreased until resonance is reached. The Q-meter dial is read and multiplied by a factor on the condenser dial to give the true Q of the external condenser. One possible scale for the Q-meter dial is derived from the above formula for $Q_x$ assuming $Q_1 = 100$ and $C_2 = C_1$ for unity on the capacity dial. That is, $$Q_x = \frac{Q_1 Q_2}{Q_1 - Q_2}$$

is marked on the Q-meter dial assuming $$\frac{C_2 - C_1}{C_1} = 1$$

This gives a scale having infinity at maximum and 100 at mid-scale and may be called a scale of "Q-factor." The factors on the variable condenser dial in the Q measuring circuit are marked in ratios of the external capacity to $C_1$ as given by the ratio $$\frac{C_2 - C_1}{C_1}$$

These factors may be positive or negative to indicate an increase or decrease of capacity to tune an external inductance or capacity. Thus, if the value of $C_1$ is chosen as 100 mmf. the factor on the condenser dial will be —0.1 for a decrease of capacity indicating an external capacity of 10 mmf. The condenser dial will show a positive factor for externally connected inductive circuits. Where the external circuit being measured is a parallel tuned circuit or a pure resistance, no change in the condenser dial will be required indicating zero reactance. In order to maintain the calibration of the Q-factor dial as the frequency is varied, means are provided also ganged to the frequency control for maintaining a constant Q in the internal Q circuit as, for instance, a variable resistor in shunt with the circuit.

Figure 1 shows a circuit diagram of one form of the present invention. It includes an oscillator tube 1 having cathode 2, heated by well-known means not shown, control grid 3 and plate 4. Tube 1 is associated with a variable inductance tank coil 5 by connecting plate 4 to one end through condenser 7, grid 3 to the other end through resistor 8 by-passed by condenser 9, and cathode 2 to an intermediate point and to ground 22 by means of ground connection 6. Plate voltage is supplied to plate 4 from a suitable source such as battery 11 through the parallel feed choke 10. Tank inductance 5 is tuned by fixed condenser 33. The frequency of oscillation of tube 1 and its associated circuit is determined by the capacity of condenser 33 and the inductance of tank coil 5. The frequency of oscillation is varied by varying the inductance of tank coil 5 as indicated by the arrow.

High frequency current from the oscillator may be fed to the Q measuring circuit in a number of well known ways as, for instance, by means of pick-up coil 12 and injection resistors 13 and 14 connected to ground at their junction. It may be convenient to measure the current being fed to resistor 13 and 14. If so a thermocouple heater 16 heating junction 18 connected to meter 19 may be placed in series with the resistors and pick-up coil 12. Since it is desired to balance the current in resistors 13 and 14 to ground a resistor 17 equal to the resistance of heater 16 is placed in the opposite side of the feed circuit. A parallel resonant circuit is formed by connecting variable condensers 20 and 21, having equal and variable capacities to ground, in series and in parallel with variable inductances 34 and 35 connected in series with resistors 13 and 14. The variable inductances 34 and 35 are ganged and are controlled by the same control which varies inductance 5. The sum of the inductances of inductors 34 and 35 is equal to inductance 5. Condensers 20 and 21 have a mid-scale value equal to twice capacity 33 so that their series capacity is equal to capacity 33. Thus with condensers 20 and 21 set at mid-scale, circuit 13—14—34—35—20—21 is always in tune with the frequency of oscillator 1 as the frequency is varied. The voltage across the resonant circuit is measured with a vacuum tube voltmeter such as diode 26 having plate 28 and cathode 27 connected in series with meter 31 and resistor 29 and across condensers 20 and 21. Meter 31 and resistor 29 may be by-passed by a condenser 30. The Q of the circuit 13—14—20—21—34—35 will be the ratio of the voltage across condensers 20 and 21 as indicated by meter 31 to the injected voltage across resistors 13 and 14 as indicated by meter 19.

In order to permit connection of a circuit to be measured, terminals 23, 25 and 24 are provided connected to either side of condensers 20 and 21 and to ground respectively. In order to provide a basis for the Q-factor dial calibration circuit 13—14—20—21—34—35 is kept at a constant predetermined Q by means of a ganged Q control means such as variable resistor 15 ganged to the control of inductances 5, 34 and 35. Resistor 15 has a law of variation such that as the frequency of oscillator 1 is varied the Q of circuit 13—14—20—21—34—35 is kept constant.

The Q of an externally connected circuit such as condenser 36 connected across terminals 23 and 25 is given by the formula:

$$Q_x = \frac{C_2 - C_1}{C_1} \times \frac{Q_1 Q_2}{Q_1 - Q_2}$$

The Q-factor dial, i. e. the dial of meter 31, is calibrated to be equal to the factor $$\frac{Q_1 Q_2}{Q_1 - Q_2}$$

The dial of condensers 20 and 21 is calibrated in terms of the reactance factor $$\frac{C_2 - C_1}{C_1}$$

Hence, the Q of condenser 36 is found directly by multiplying the reading of the Q-factor dial by the reading of the reactance factor dial. $C_1$ is the capacity value of the Q circuit tuning condenser (21—22) initially, $Q_1$ is the Q with no external circuit connected corresponding to $C_1$, $C_2$ is the value of the Q circuit capacity required to produce resonance with the circuit to be measured connected, and $Q_2$ is the Q of the entire circuit including the circuit to be measured.

Figure 2:
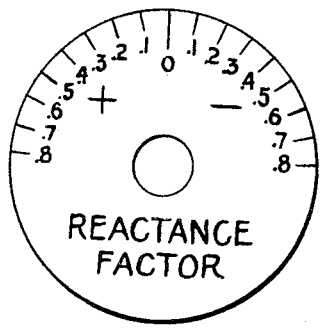
Figure 2 shows a condenser dial for one form of the present invention.

A typical reactance factor dial is shown in Figure 2. The initial capacity required to tune the Q circuit is located at the center of the dial and is marked zero. Factors on the decreasing capacity side of zero are marked with a negative sign to indicate external capacities or effective capacities while factors on the increasing capacity side of zero are marked positive to indicate external inductances or effective inductances.

Figure 3:
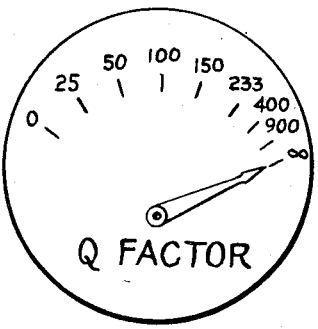
Figure 3 shows a Q-factor scale for one form of the present invention.

A typical Q-factor scale is shown in Figure 3 based on an initial Q (without externally connected circuits) of 100. Before a circuit to be measured is connected the Q-factor reading should be set to infinity by varying the injection voltage.

As an example, if zero on the reactance factor dial corresponds to 100 mmf. (condensers 20 and 21 in series) and the internal Q circuit has a Q of 100, a 10 mmf. condenser having a Q of 90 will read 900 on the Q-factor meter dial. The reactance factor dial will read $$\frac{10}{100} = 0.1$$

on the minus side and thus 900×0.1=90 will be the true Q of the condenser. An inductance having the same Q and reactance will read the same but on the positive side of the reactance factor dial.

Figure 4:
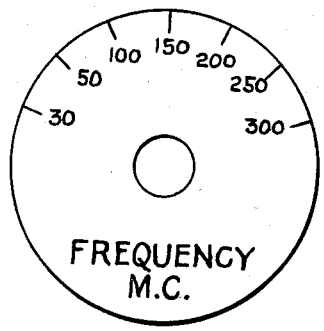
Figure 4 shows a frequency dial for one form of the present invention.

Figure 4 shows a dial for the oscillator frequency control, i. e. inductance 5. This dial also controls inductors 34 and 35 and Q compensating resistor 15.

Parallel tuned circuits or resistors may be measured by applying the formula:

$$R_p = \frac{1.59 \times 10^5}{fC_1} \times \frac{Q_1 Q_2}{(Q_1 - Q_2)}$$

As before, $$\frac{Q_1 Q_2}{Q_1 - Q_2}$$

is read on the Q-factor dial. The value $C_1$ is known and $f$ is read on the frequency control dial in megacycles. The value $R_p$ is the resistance in ohms of a resistor or the tuned impedance of a parallel tuned circuit.

Figure 5:
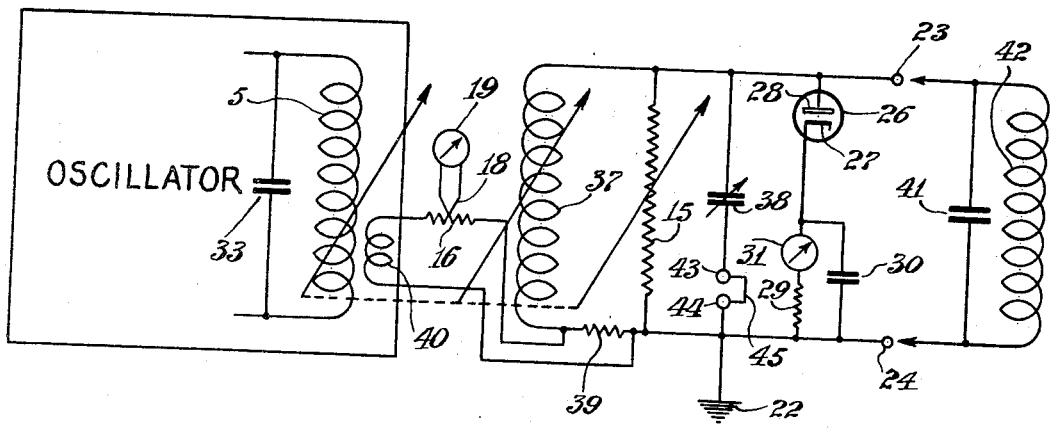
Figure 5 shows a modified circuit of one form of the present invention.

Figure 5 shows a modified circuit which is useful for single-ended circuit measurements. Inductances 34 and 35 are replaced by the single inductance 37 which is variable and ganged and tracked with oscillator inductance 5. The oscillator voltage is injected by means of coil 40 coupled to oscillator inductance 5 and which feeds resistor 39 in series with the Q circuit.

Condensers 20 and 21 are replaced by the single variable condenser 38, and as before resistor 15 ganged with the oscillator inductance control maintains constant Q in the measuring circuit. A single-ended parallel-resonant circuit made up of coil 42 tuned by condenser 41 is shown to be connected to terminals 23 and 24 for measuring its Q. Also shown in Figure 5 is provision for measuring large condensers, small inductances or small resistors by series connection with the Q measuring circuit. This series connection is made by connecting the circuit to be measured across terminals 43 and 44 in series with the Q circuit after removing shorting link 45.

When circuits having a low Q are measured it may be useful to increase the injection voltage. This may be done by a definite ratio from a scale on meter 19 and the Q-factor meter reading corrected accordingly. A larger deflection being produced on the Q-factor dial is more accurately readable.

While only two possible forms of the present invention have been shown and described, many modifications will be apparent to those skilled in the art within the spirit and scope of the appended claims.

What is claimed is:

1. In a device for measuring the Q of an impedance, the combination of, a measured source of high frequency current, a parallel tuned circuit including said source in series and initially tuned by a predetermined mean capacity value of a variable condenser, means for connecting an impedance to be measured in parallel with said tuned circuit, a voltmeter across said tuned circuit calibrated in terms of $$\frac{Q_1 Q_2}{Q_1 - Q_2}$$

where $Q_1$ is the Q of the tuned circuit before connecting the external circuit and $Q_2$ is the Q of the combined tuned and external circuit, and a scale on said variable condenser in terms of $$\frac{C_2 - C_1}{C_1}$$

where $C_1$ is said mean capacity and $C_2 - C_1$ is the apparent reactance of the external circuit, and the Q of the external circuit being $Q_x$ where $Q_x$ is equal to the voltmeter scale reading times the variable condenser scale reading.

2. In a Q-measuring device, the combination of, a source of high frequency alternating current, a circuit tunable to the frequency of said current, means for injecting at least a portion of said current into said circuit, constant capacity means for tuning said circuit to said frequency, single control means for varying the frequency of said source and said tuning means, means for coupling a circuit to be measured with said circuit and means for measuring the voltage across the first said circuit before and after the coupling of said external circuit in terms of a factor which is a function of the Q of the first said circuit and the Q of the coupled circuit.

3. In a Q-measuring device, the combination of, a source of high frequency alternating current, a frequency calibrated control for varying the frequency of said source, a tuned circuit coupled to said source of current, a tuning control for said circuit calibrated in ratios of departure of reactance from a predetermined value, means for coupling a circuit to be measured to said tuned circuit, and means for indicating the voltage across said tuned circuit calibrated in terms of the product of the Q of the tuned circuit and the Q of the circuit to be measured divided by the difference of said Q's.

4. In a Q-measuring device, the combination of, a source of high frequency alternating current, a frequency calibrated control for varying the frequency of said source, a tuned circuit coupled to said source of current, a tuning control for said circuit calibrated in ratios of departure of reactance from a predetermined value to that value, means for keeping the Q of said tuned circuit substantially constant as said tuning is varied, means for coupling a circuit to be measured to said tuned circuit, and means for indicating the voltage across said tuned circuit calibrated in terms of the product of the Q of the tuned circuit and the Q of the circuit to be measured divided by the difference of said Q's.

5. In a Q-measuring device, the combination of, a source of high frequency alternating current, a tuned circuit coupled to said source of current, means for maintaining the Q of said circuit constant, a single control for varying the frequency of said source, the tuning of said circuit and for operating said Q maintaining means, means for coupling a circuit to be measured to the first said circuit and means for indicating the resulting voltage across said tuned circuit for measuring the Q of the said circuit to be measured.

WILLIAM D. LOUGHLIN.